United States Patent
Vairavakkalai et al.

(10) Patent No.: US 9,871,726 B2
(45) Date of Patent: Jan. 16, 2018

(54) SEMANTIC INFORMATION FOR LABELS IN BORDER GATEWAY PROTOCOL

(71) Applicant: Juniper Network, Inc., Sunnyvale, CA (US)

(72) Inventors: Kaliraj Vairavakkalai, Fremont, CA (US); Chandrasekar Ramachandran, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 188 days.

(21) Appl. No.: 14/675,318

(22) Filed: Mar. 31, 2015

(65) Prior Publication Data

US 2016/0294684 A1   Oct. 6, 2016

(51) Int. Cl.
| | |
|---|---|
| *H04L 12/26* | (2006.01) |
| *H04L 12/723* | (2013.01) |
| *H04L 12/46* | (2006.01) |
| *H04L 12/781* | (2013.01) |
| *H04L 12/751* | (2013.01) |
| *H04L 12/715* | (2013.01) |

(52) U.S. Cl.
CPC ........ *H04L 45/507* (2013.01); *H04L 12/4633* (2013.01); *H04L 45/02* (2013.01); *H04L 45/04* (2013.01); *H04L 45/52* (2013.01)

(58) Field of Classification Search
CPC ......... H04L 45/50; H04L 45/02; H04L 45/04; H04L 12/1886; H04L 12/4641; H04L 12/4675; H04L 12/66; H04L 45/00; H04L 45/16; H04L 45/22; H04L 45/24
USPC ................................. 370/221, 230, 345, 390
See application file for complete search history.

(56) References Cited

U.S. PATENT DOCUMENTS

| | | | |
|---|---|---|---|
| 7,751,405 B1 | 7/2010 | Kompella | |
| 7,826,482 B1 * | 11/2010 | Minei ..................... | H04L 45/24 370/395.5 |
| 8,634,422 B2 * | 1/2014 | Sali ..................... | H04L 12/5693 370/345 |
| 2007/0133406 A1 * | 6/2007 | Vasseur ................... | H04L 45/02 370/230 |
| 2008/0170578 A1 * | 7/2008 | Ould-Brahim ...... | H04L 12/4641 370/401 |

(Continued)

OTHER PUBLICATIONS

Rosen, "BGP/MPLS IP Virtual Private Networks (VPNs)," https://www.ietf.org/rfc/rfc4364.txt, Feb. 2006, 47 pages.

(Continued)

*Primary Examiner* — Sai Aung
(74) *Attorney, Agent, or Firm* — Harrity & Harrity, LLP

(57) ABSTRACT

A device may receive a set of border gateway protocol labels via a set of corresponding border gateway protocol messages. A border gateway protocol label, of the set of border gateway protocol labels, may be associated with a label descriptor attribute. The label descriptor attribute being associated with providing information regarding a forwarding semantic associated with the border gateway protocol label. The device may select the border gateway protocol label for routing network traffic toward a network device associated with the border gateway protocol label based on the label descriptor attribute. The device may route the network traffic toward the network device based on the border gateway protocol label and after selecting the border gateway protocol label.

20 Claims, 12 Drawing Sheets

(56) References Cited

U.S. PATENT DOCUMENTS

| | | | | |
|---|---|---|---|---|
| 2009/0175274 A1* | 7/2009 | Aggarwal | ........... | H04L 12/1886 370/390 |
| 2009/0296568 A1* | 12/2009 | Kitada | .................... | H04L 45/00 370/221 |
| 2012/0069847 A1* | 3/2012 | Saad | ....................... | H04L 45/02 370/392 |
| 2015/0332155 A1* | 11/2015 | Mermoud | ............ | G06N 99/005 706/12 |

OTHER PUBLICATIONS

Osborne, "Traffic Engineering with MPLS," Cisco Press, Jul. 17, 2002, 675 pages.
Extended European Search Report corresponding to EP Application No. 15186528.4, mailed on Jul. 29, 2016, 16 pages.
Wikipedia, "Border Gateway Protocol," http://en.wikipedia.org/wiki/Border_Gateway_Protocol, Mar. 27, 2015, 18 pages.

\* cited by examiner

| Bit: 0 | 0 1 2 3 4 5 6 7 8 9 0 1 2 3 4 5 6 7 8 9 0 1 2 3 4 5 6 7 8 9 0 1 | | |
|---|---|---|---|
| | 0 | 1 | 2 3 |
| Row: | | | |
| 1 | 1 1 0 1 (Flags) | Attr. Type Code | Length |
| 2 | ... 3107 encoded Label Value... | | |
| 3 | PNH-Len | ... PNH Address /32 or /128 ... | |
| 4 | Num-NexthopLegs | Flags | |
| 5 | ...one or more Label-Semantics TLV... | | |

Label Descriptor Attribute

FIG. 5A

BGP Label descriptor attribute

| Bit: | 0 1 2 3 4 5 6 7 | 8 9 0 1 2 3 4 5 | 6 7 8 9 0 1 2 3 | 4 5 6 7 8 9 0 1 |
|---|---|---|---|---|
| Row: 0 | | 1 | 2 | 3 |
| 1 | 1101 (Flags) | Attr. Type Code | Length | |
| 2 | Label L1 encoded in RFC3107 format | | | |
| 3 | loopback0-Addr | | | |
| 4 | Num-Nexthops = 2 | | Flags (F=1, means FRR) | |
| 5 | ...Two label semantics TLVs (Fig. 6C and 6D) | | | |

Label Semantics TLV #1
(Forwarding Semantic Information)

| Bit: | 0 1 2 3 4 5 6 7 | 8 9 0 1 2 3 4 5 | 6 7 8 9 0 1 2 3 4 5 | 6 7 8 9 0 1 |
|---|---|---|---|---|
| Row: | | | | |
| 1 | POP-And-Forward | Len = 16 | One Nexthop | |
| 2 | IPv4-Nexthop | | | |
| 3 | Flags(C=1, 4=1) | | Len | Weight=1 |
| 4 | NhopAddr TLV(Len=4, Value=10.1.0.1) | | | |

FIG. 6C

Label Semantics TLV #2
(Forwarding Semantic Information)

| Bit: | 0 1 2 3 4 5 6 7 | 8 9 0 1 2 3 4 5 | 6 7 8 9 0 1 2 3 4 5 6 7 8 9 0 1 |
|---|---|---|---|
| Row: | | | |
| 1 | POP-And-Forward | Len = 16 | one Nexthop |
| 2 | IPv4Nexthop | | |
| 3 | Flags(C=1, 4=1) | | Len | Weight=1 |
| 4 | NhopAddr TLV(Len=4, Value=10.2.0.2) | | |

SEMANTIC INFORMATION FOR LABELS IN BORDER GATEWAY PROTOCOL

BACKGROUND

Border gateway protocol (BGP) may be utilized to exchange information associated with routing and reachability between network devices in a network, such as a set of edge devices. A first network device may provide, to a second network device, reachability information via a BGP label that advertises a route for network traffic travelling from the second network device to a third network device via the first network device. The first network device may perform one or more actions on network traffic when routing the network traffic from the second network device to the third network device.

SUMMARY

According to some possible implementations, a device may receive a set of border gateway protocol labels via a set of corresponding border gateway protocol messages. A border gateway protocol label, of the set of border gateway protocol labels, may be associated with a label descriptor attribute. The label descriptor attribute being associated with providing information regarding a forwarding semantic associated with the border gateway protocol label. The device may select the border gateway protocol label for routing network traffic toward a network device associated with the border gateway protocol label based on the label descriptor attribute. The device may route the network traffic toward the network device based on the border gateway protocol label and after selecting the border gateway protocol label.

According to some possible implementations, a method may include receiving, by a device, a plurality of border gateway protocol labels from one or more other devices. A particular border gateway protocol label, of the plurality of border gateway protocol labels, may be generated by a particular device of the one or more other devices. The particular border gateway protocol label being associated with a particular forwarding semantic identified by a particular label descriptor attribute. The particular forwarding semantic being stored in a forwarding table of the particular device. The method may include determining, by the device, the particular forwarding semantic based on the particular label descriptor attribute. The method may include selecting, by the device, the particular border gateway protocol label from the plurality of border gateway protocol labels based on the particular forwarding semantic. The method may include causing, by the device, network traffic to be routed toward a destination device via the particular device based on selecting the particular border gateway protocol label.

According to some possible implementations, a computer-readable medium may store instructions that comprise one or more instructions that, when executed by one or more processors of a device, cause the one or more processors to receive a set of border gateway protocol labels via a set of corresponding border gateway protocol messages. A border gateway protocol label, of the set of border gateway protocol labels, may be associated with a label descriptor attribute. The label descriptor attribute may be associated with providing information regarding a forwarding semantic associated with the border gateway protocol label. The one or more instructions, when executed by the one or more processors, may further cause the one or more processors to select the border gateway protocol label for routing network traffic toward a network device associated with the border gateway protocol label based on the label descriptor attribute. The one or more instructions, when executed by the one or more processors, may further cause the one or more processors to route the network traffic toward the network device based on the border gateway protocol label and after selecting the border gateway protocol label.

BRIEF DESCRIPTION OF THE DRAWINGS

FIGS. 5A-5C are diagrams of an example BGP label including a label descriptor attribute including forwarding information; and FIGS. 6A-6E are diagrams of an example implementation relating to the example process shown in FIG. 4.

DETAILED DESCRIPTION

The following detailed description of example implementations refers to the accompanying drawings. The same reference numbers in different drawings may identify the same or similar elements.

Border gateway protocol (BGP) may be utilized by a network to facilitate an exchange of routing and/or reachability information between network devices of the network, such as edge devices, gateway devices, route reflectors, peer devices, servers, or the like. A first network device may provide a BGP label to a second network device to advertise reachability information (e.g., a route for network traffic to a destination network device). For example, the first network device (e.g., a BGP labeled-unicast speaker, such as a routing device, or the like) may advertise a label to the second network device (e.g., an ingress provider edge server) that receives network traffic from a network traffic source. The label may be associated with a particular forwarding semantic (e.g., a forwarding action, a network device attribute of a particular network device performing forwarding, a network connection attribute of a connection between the particular network device performing forwarding and a destination network device, or the like). A first label may be preferred over a second label based on the respective forwarding semantics associated with the first label and the second label. Implementations, described herein, may facilitate providing forwarding information describing the forwarding semantic when providing a BGP label, thereby facilitating selection of the BGP label for routing traffic.

Figure 1:
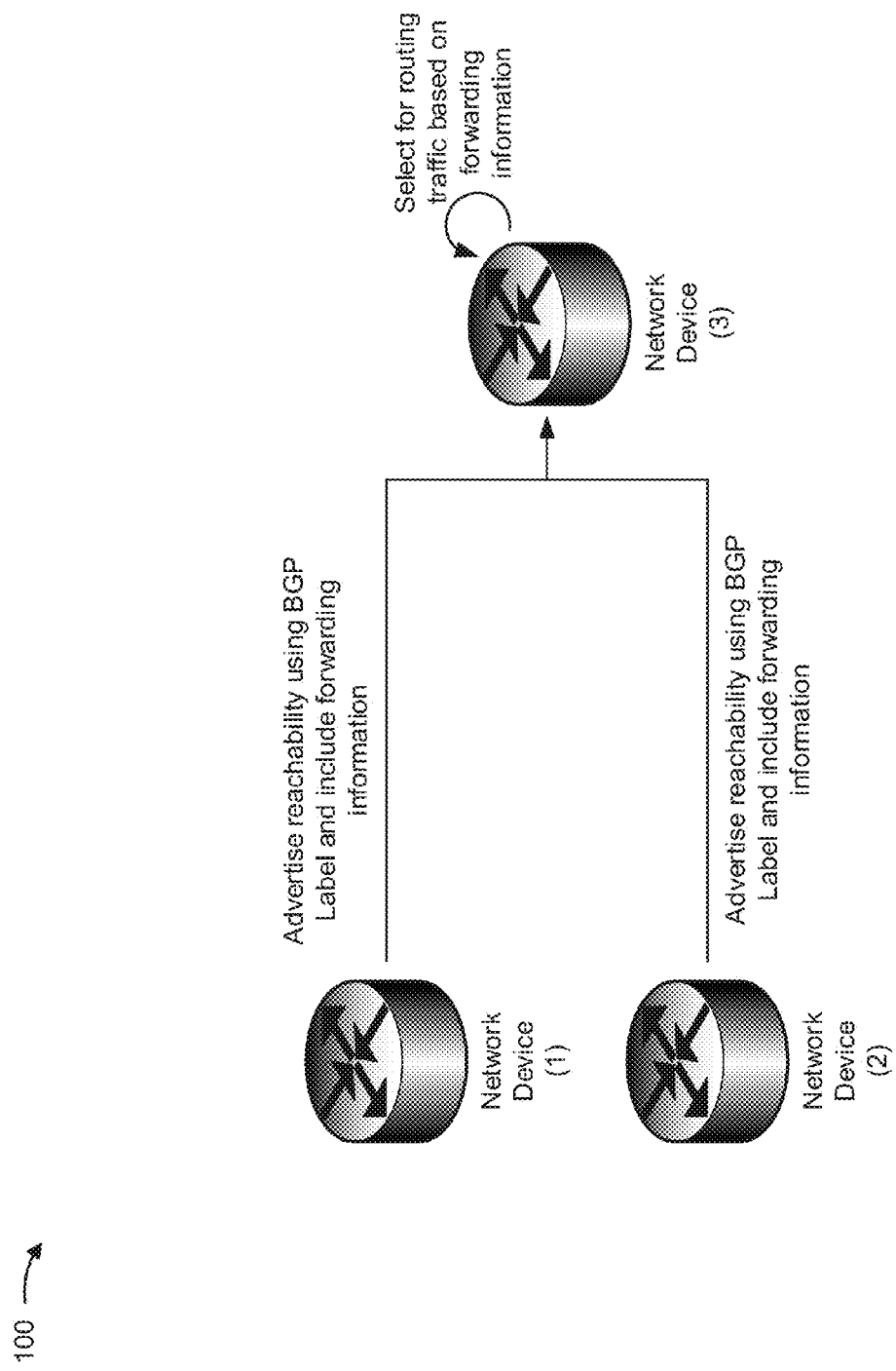
FIG. 1 is a diagram of an overview of an example implementation described herein.

FIG. 1 is a diagram of an overview of an example implementation 100 described herein. As shown in FIG. 1, a network may include multiple network devices, such as a first network device, a second network device, and a third network device. Assume that the first network device and the second network device are configured to route traffic from the third network device to a fourth network device (not shown). The first network device and the second network device may advertise reachability using a BGP label. Reachability (e.g., network layer reachability information (NLRI))

may refer to information associated with indicating that network traffic may be routed to a particular destination network device (e.g., the fourth network device) via a particular network device advertising the reachability information.

Each BGP label (e.g., a first BGP label provided by the first network device and a second BGP label provided by the second network device) may be associated with a particular forwarding semantic. For example, a particular BGP label may be associated with a Pop-and-forward forwarding action, a swap forwarding action, a push forwarding action, a Pop-and-IP-forward forwarding action, a BGP fast reroute (FRR) action, or the like. Additionally, or alternatively, a particular BGP label may be associated with a 1 Gigabit bandwidth (G) next-hop, a 10G next-hop, or the like. A particular network device (e.g., the first network device, the second network device, etc.) may provide a label descriptor attribute when providing the BGP label. The label descriptor attribute may be a BGP optional-transitive path attribute that may be included in the BGP route update that advertises BGP labeled prefixes. The Label descriptor attribute may include multiprotocol label switching (MPLS) forwarding semantics shared by a set of MPLS-Label values advertised in a particular BGP route update. For example, the first network device may provide the first BGP label with a first label descriptor attribute that indicates that the first network device will perform a Pop-and-IP-forward action when routing network traffic.

As further shown in FIG. 1, for a particular BGP-prefix, the third network device may receive the first BGP label from the first network device and the second BGP label from the second network device. The third network device may determine forwarding semantics associated with each BGP label based on respective label descriptor attributes included with each BGP label. Based on the forwarding semantics, the third network device may, when receiving network traffic for routing to a destination device (e.g., the fourth network device which is associated with the particular BGP-prefix), select one of the BGP labels for routing traffic to the destination device. For example, when the first BGP label is associated with providing an FRR action and the second BGP label is not associated with providing an FRR action, the third network device may select the first BGP label, and may cause traffic to be routed via the first network device in accordance with the first BGP label (e.g., with the FRR action).

In this way, a network device may intelligently select a BGP label associated with routing traffic based on a label descriptor attribute describing a forwarding semantic associated with the BGP label.

Figure 2:
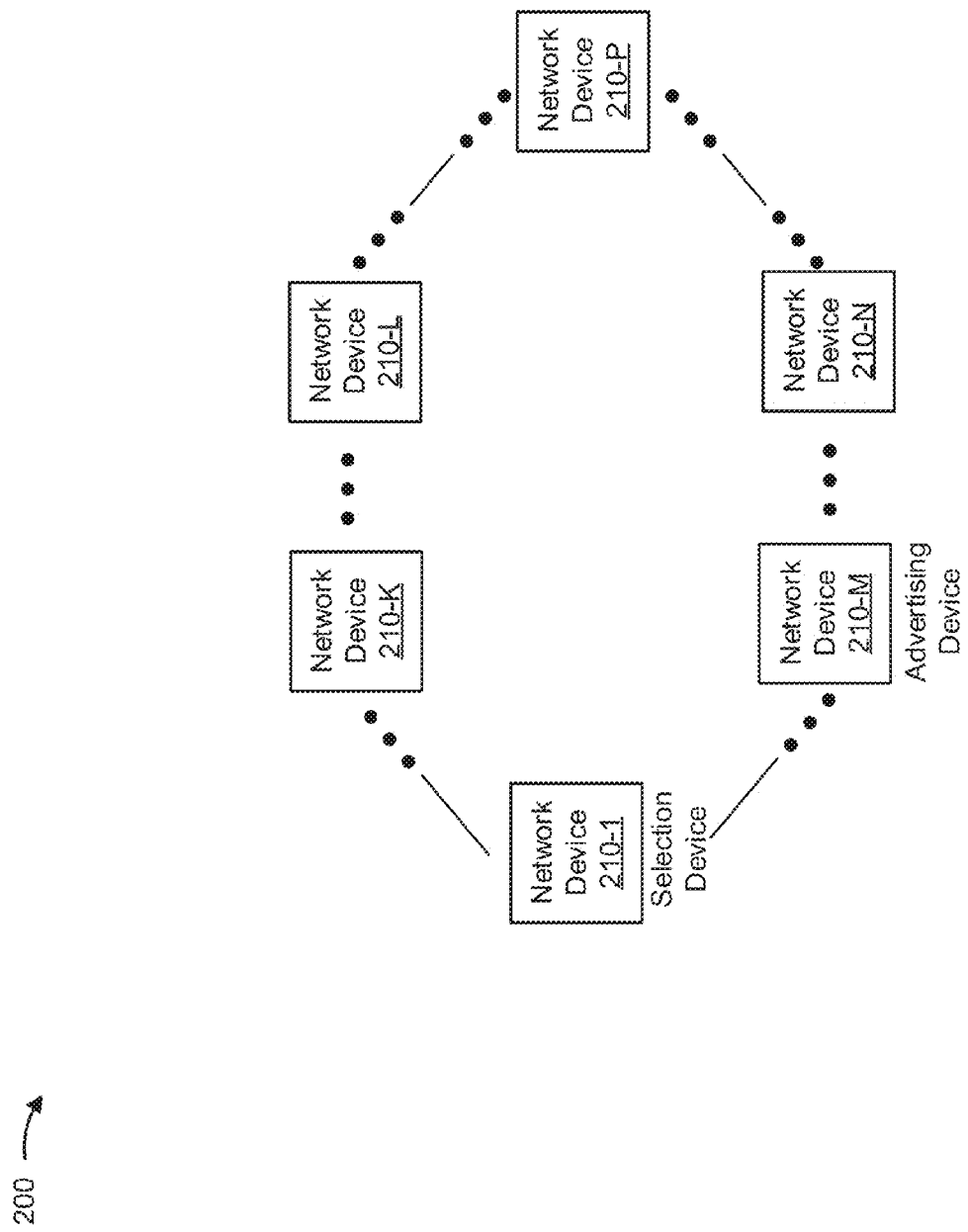
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more network devices 210-1 through 210-P (P≥1) (hereinafter referred to collectively as "network devices 210," and individually as "network device 210") and one or more networks. Devices of environment 200 may interconnect via wired connections, wireless connections, or a combination of wired and wireless connections.

Network device 210 may include one or more devices (e.g., one or more traffic transfer devices) capable of processing and/or transferring traffic between endpoint devices. For example, network device 210 may include a firewall, a router, a gateway, a switch, a hub, a bridge, a reverse proxy, a server (e.g., a proxy server), a security device, an intrusion detection device, a load balancer, or a similar device. In some implementations, network device 210 may include a traffic transfer device associated with providing and/or receiving information via BGP. For example, network device 210 may include an ingress provider edge device, a route reflector device, a peer device, an autonomous system boundary router, a top of rack (ToR) device, or the like.

When a first network device 210 provides a BGP label for selection by a second network device 210, the first network device 210 may be termed a secondary network device 210. The second network device 210, which is performing selection of the BGP label, may be termed a primary network device 210. A third network device 210 that is a source of network traffic may be termed a source network device 210 and a fourth network device 210 that is a destination for network traffic may be termed a destination network device 210. A particular network device 210 may be, for example, both a secondary network device 210 and a destination network device 210, both a primary network device 210 and a secondary network device 210, both a primary network device 210 and a source network device 210, or the like. Additionally, or alternatively, network device 210 may switch from, for example, being a primary network device 210 to being a secondary network device 210.

Network device 210 may be associated with one or more networks, in some implementations. Similarly, a network, of the one or more networks, may include one or more network devices 210. In some implementations, the one or more networks may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
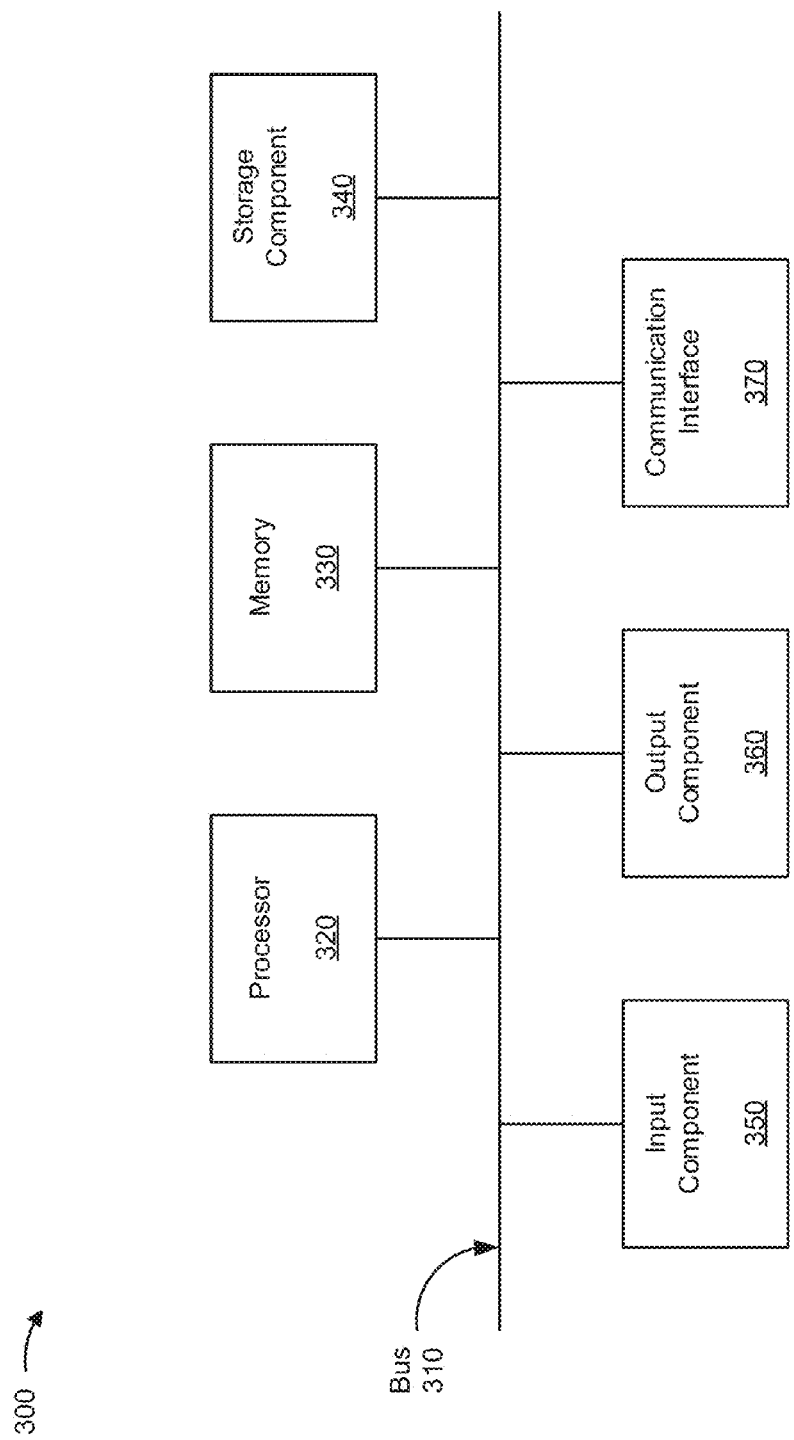
FIG. 3 is a diagram of example components of one or more devices of FIG. 2.

FIG. 3 is a diagram of example components of a device 300. Device 300 may correspond to network device 210. In some implementations, network device 210 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
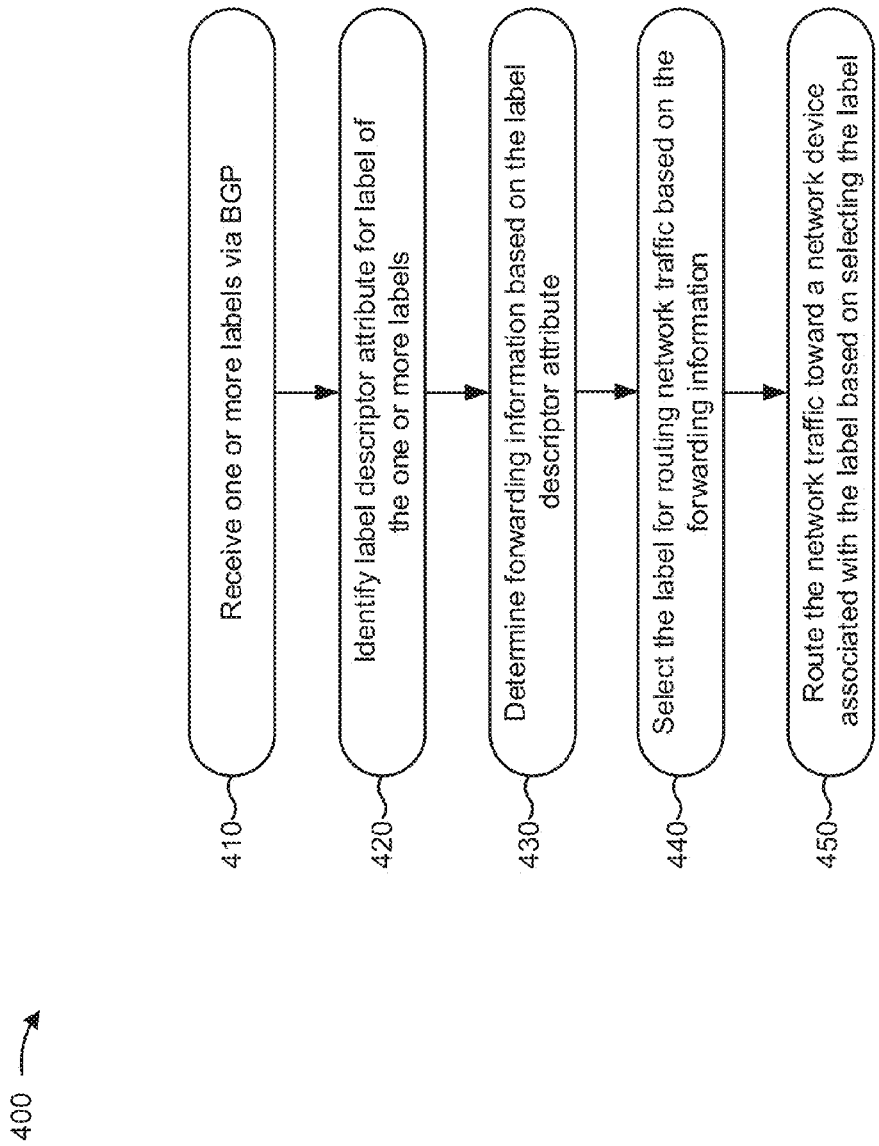
FIG. 4 is a flow chart of an example process for utilizing forwarding information associated with a border gateway protocol (BGP) label to intelligently route network traffic.

FIG. 4 is a flow chart of an example process 400 for utilizing forwarding information associated with a border gateway protocol (BGP) label to intelligently route network traffic. In some implementations, one or more process blocks of FIG. 4 may be performed by network device 210. In some implementations, one or more process blocks of FIG. 4 may be performed by another device or a set of devices separate from or including network device 210.

As shown in FIG. 4, process 400 may include receiving one or more labels via BGP (block 410). For example, network device 210 may receive one or more labels (e.g., one or more BGP labels) via BGP. When a particular network device 210 receives a label, the particular network device 210 may be termed a primary network device 210. By contrast, when another network device 210 advertises a label (e.g., transmits the label to primary network device 210), the other network device 210 may be termed a secondary network device 210. For example, primary network device 210 may receive the one or more labels via BGP from one or more secondary network devices 210.

A label may refer to a BGP message, transmitted from secondary network device 210 to primary network device 210, which advertises reachability of a destination network device 210 (e.g., a particular network device 210 to which network traffic may be routed). For example, secondary network device 210 may advertise a label indicating that network traffic may be routed from primary network device 210 to secondary network device 210 and from secondary network device 210 to destination network device 210. In some implementations, a label may be associated with a particular forwarding semantic (e.g., an action that may be performed on the network traffic when routing the network traffic, an attribute of a particular network device 210 associated with routing the network traffic, an attribute of a connection between multiple network devices 210 associated with routing the network traffic, or the like). For example, the particular forwarding semantic may include performing Pop-and-forward routing, swap routing, push routing, Pop-and-IP-forward routing, fast reroute (FRR) routing, equal-cost multi-path (ECMP) routing, or the like. Additionally, or alternatively, a label may be associated with a particular next-hop attribute, such as a 1G next-hop attribute, a 10G next-hop attribute, or the like.

Primary network device 210 may receive multiple labels from a particular secondary network device 210, in some implementations. For example, primary network device 210 may receive a first label associated with a first route to a first destination network device 210 and a second label associated with a second route to a second destination network device 210. Additionally, or alternatively, primary network device 210 may receive a first label associated with a first forwarding semantic for routing traffic using the first route to the first destination network device 210 and a second label associated with a second forwarding semantic for routing traffic using the first route to the first destination network device 210.

Primary network device 210 may receive multiple labels from multiple secondary network devices 210, in some implementations. For example, primary network device 210 may receive a first label for a first route via a first secondary network device 210 to destination network device 210 and a second label for a second route via a second secondary network device 210 to destination network device 210.

Primary network device 210 may receive a particular label that is associated with a label descriptor attribute (e.g., that is received via a BGP route update message), in some implementations. For example, secondary network device 210 may determine forwarding information (e.g., a forwarding semantic, next-hop information, or the like that may be included in a forwarding table) associated with a route (e.g., a route to a destination network device 210 identified by a prefix), may encode the forwarding information as a label descriptor attribute associated with the particular label, and may provide the particular label descriptor attribute to primary network device 210. In this case, primary network device 210 and secondary network device 210 may be associated with information and/or include a data structure associated with mapping forwarding information to information transmittable via a label. For example, primary network device 210 may include a data structure storing information associated with determining a forwarding semantic indicated by a particular set of bits of the label descriptor attribute.

In some implementations, the label descriptor attribute may be associated with a particular propagation rule associated with forwarding the label descriptor attribute. For example, a BGP route advertising the label may include the label descriptor attribute attached by a first network device 210 (e.g., a BGP speaker) that advertises the labeled-route. Another network device 210 that alters a protocol next hop (PNH) while re-advertising the labeled-route (e.g., and allocating a new label), may alter the label descriptor attribute based on an altered forwarding semantic of the new label. In some implementations, redundancy may be introduced by a third network device 210 (e.g., a receiver speaker) that receives a BGP route update associated with a label descriptor attribute by the third network device 210 comparing the label descriptor attribute PNH to the PNH of the labeled-route associated therewith. When the label descriptor attribute PNH does not match the PNH of the labeled-route associated with the label descriptor attribute, third network device 210 may determine that second network device 210 failed to alter the label descriptor attribute and may determine that the label descriptor attribute is in error.

As further shown in FIG. 4, process 400 may include identifying a label descriptor attribute for a label of the one or more labels (block 420). For example, network device 210 (e.g., primary network device 210) may identify the label descriptor attribute. In some implementations, primary network device 210 may determine that the label descriptor attribute is included with a BGP route update that is associated with a BGP labeled prefix. For example, primary network device 210 may utilize stored information associated with identifying the label descriptor attribute to determine that the label descriptor attribute is included with the BGP route update. Additionally, or alternatively, primary network device 210 may include information indicating that information received (e.g., from a particular secondary network device 210) includes label descriptor attributes. In some implementations, primary network device 210 may identify information in the BGP labeled prefix indicating that one or more label descriptor attributes are included. For example, secondary network device 210 may include information (e.g., a set of bits) that indicates that a particular sub-set of the bits are associated with the label descriptor attribute.

As further shown in FIG. 4, process 400 may include determining forwarding information based on the label descriptor attribute (block 430). For example, network device 210 (e.g., primary network device 210) may determine the forwarding information based on the label descriptor attribute. In some implementations, primary network device 210 may compare the label descriptor attribute with stored information mapping label descriptor attributes to forwarding information regarding a forwarding semantic of the label. For example, primary network device 210 may identify a numerical value of the label descriptor attribute and may determine that the numerical value corresponds to a Pop-and-forward forwarding action, a swap forwarding action, or the like. Additionally, or alternatively, primary network device 210 may identify one or more other values, such as numerical values, character values, or the like, and may determine that the one or more other values correspond to next-hop information, such as a next-hop description, a next-hop bandwidth, or the like.

As further shown in FIG. 4, process 400 may include selecting the label for routing network traffic based on the forwarding information (block 440). For example, network device 210 (e.g., primary network device 210) may select the label, from the one or more labels, for routing network traffic (e.g., to destination network device 210 via a particular secondary network device 210 associated with the label). In some implementations, primary network device 210 may select the label based on a forwarding semantic. For example, primary network device 210 may determine that routing traffic in accordance with a particular label (e.g., via network devices 210 associated with the particular label and according to a forwarding semantic associated with the particular label) is associated with causing traffic to be routed faster, with less packet loss, or the like as compared with routing traffic in accordance with another label (e.g., based on a prioritization of forwarding semantics). Additionally, or alternatively, primary network device 210 may assign scores to multiple labels based on a set of selection criteria, such as a set of network performance criteria, or the like, and may select the label based on a score associated with the label.

In some implementations, primary network device 210 may select the label for routing a portion of network traffic (e.g., a flow of network packets, a set of network packets, etc.). For example, primary network device 210 may utilize the label for routing a first portion of network traffic and may utilize another label for routing a second portion of network traffic. In some implementations, primary network device 210 may select the portion of network traffic based on determining to provide preferential treatment for the portion of network traffic. For example, primary network device 210 may determine that the portion of network traffic is to receive preferential treatment, based on a type of network traffic associated with the portion of network traffic, a source of the portion of network traffic, a quality of service parameter associated with the portion of network traffic, or the like. In this case, primary network device 210 may utilize the label based on the label being associated with a forwarding semantic providing preferential treatment compared with other forwarding semantics associated with other labels.

As further shown in FIG. 4, process 400 may include routing the network traffic toward a network device associated with the label based on selecting the label (block 450). For example, network device 210 (e.g., primary network device 210) may cause traffic to be routed toward another network device 210 (e.g., secondary network device 210) associated with the label, and secondary network device 210 may route the network traffic toward yet another network device 210 (e.g., destination network device 210). In some implementations, primary network device 210 may cause a particular forwarding action to be performed when routing the network traffic. For example, primary network device 210 may select the label based on the particular forwarding semantic associated with the label and secondary network device 210 may perform a particular forwarding action when receiving the network traffic based on primary network device 210 utilizing the label.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5B:
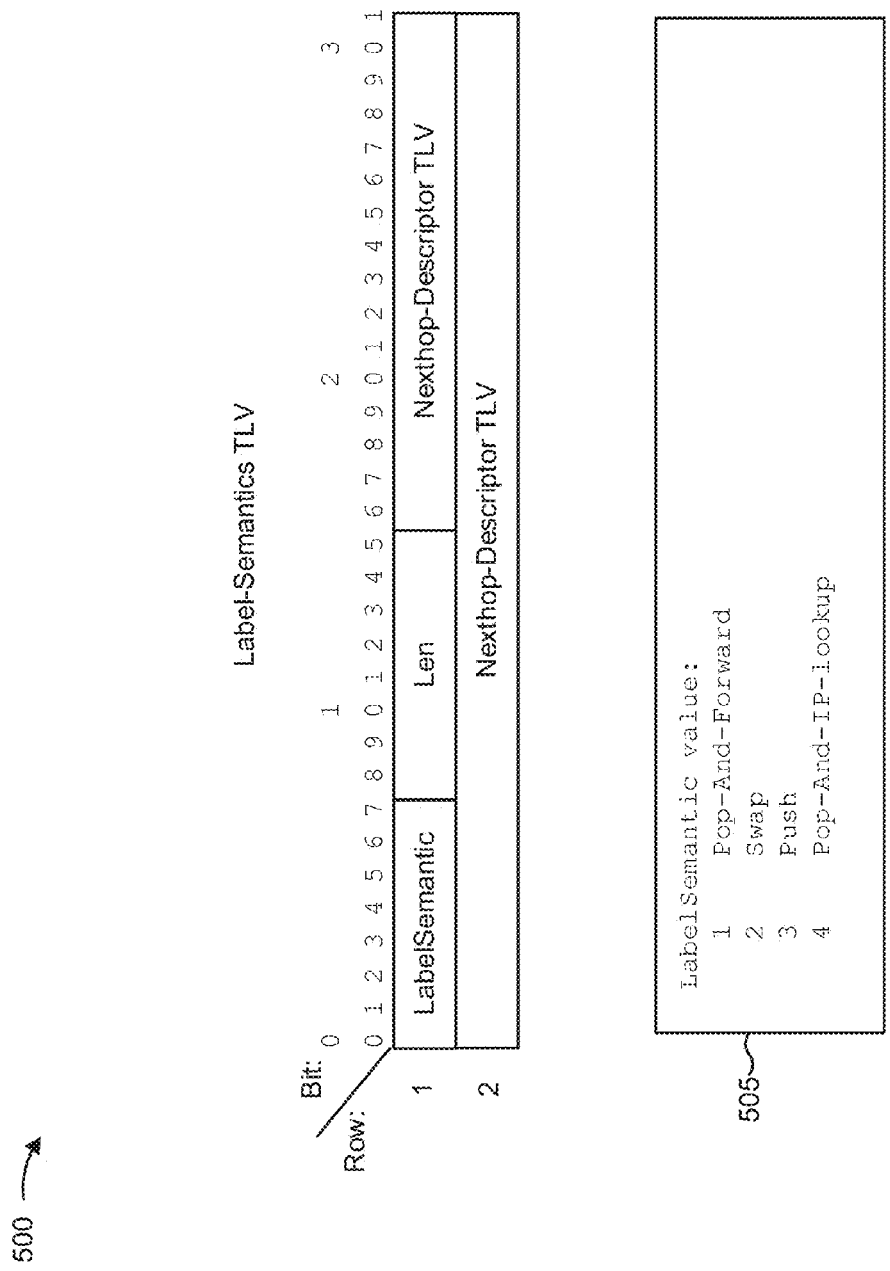
Figure 5C:
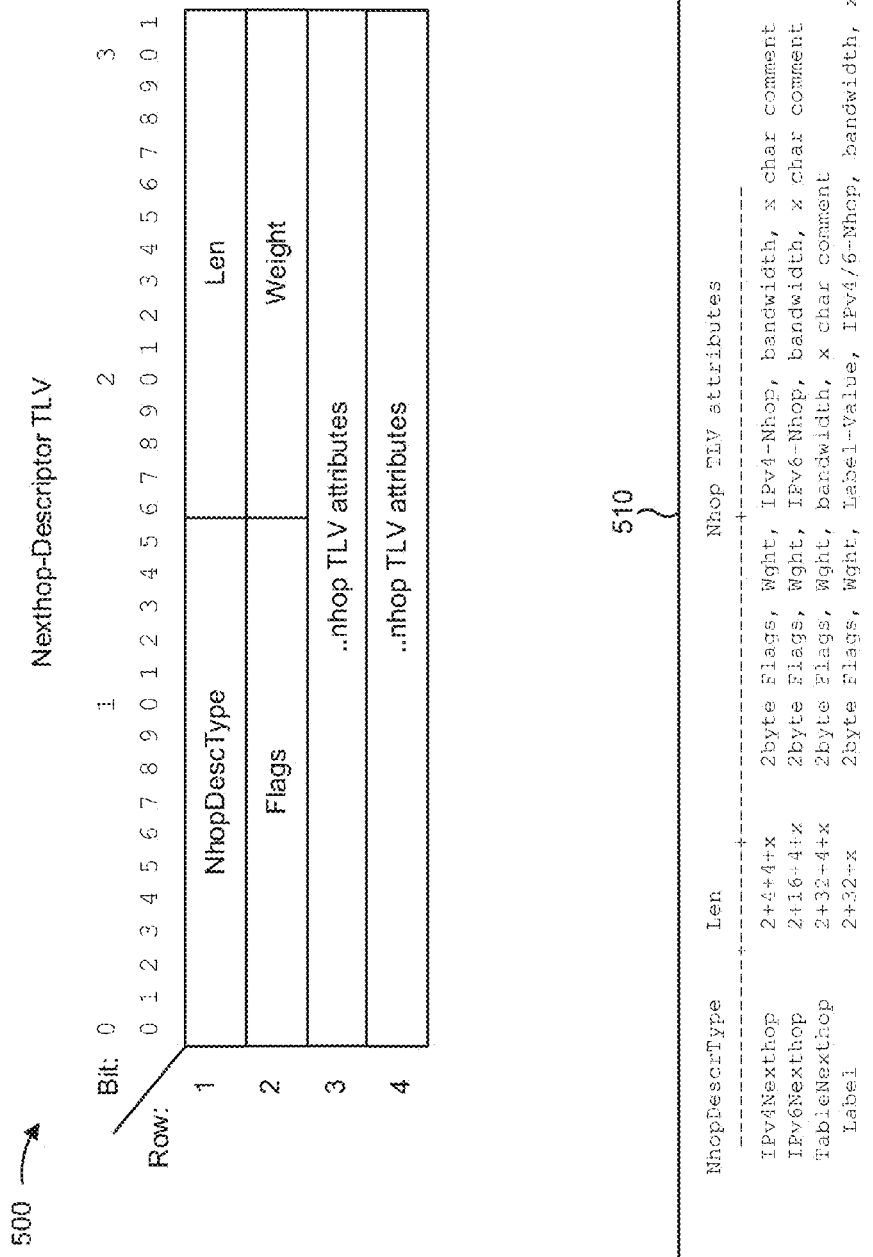

FIGS. 5A-5C are diagrams of an example implementation 500 of an example BGP label including a label descriptor attribute including forwarding information. FIGS. 5A-5C show an example of a BGP label that includes a label descriptor attribute.

As shown in FIG. 5A, a "BGP label descriptor attribute" may include a set of bits that provide information regarding reachability of a particular destination network device 210, which may be identified by a BGP prefix. As shown in the first row of the BGP label descriptor attribute, a length field may be utilized to specify a length of the attribute data. The length field describes a quantity of bits of the BGP label including the label descriptor attribute. As shown in the second row of the BGP label descriptor attribute, the BGP label descriptor attribute includes an encoded label value, such as an RFC 3107 encoded label value, or the like, describing reachability of destination network device 210. As shown in the third row of the BGP label descriptor attribute, the BGP label descriptor attribute includes a Protocol-next-hop length field (PNH-Len) to provide information regarding a quantity of bits describing a Protocol-next-hop address (PNH) that identifies a device that is intended to receive and/or process MPLS traffic sent with an associated label, as also shown in the third row of the BGP label descriptor attribute. As shown in the fourth row of the BGP label descriptor attribute, the BGP label descriptor attribute includes information providing next-hop information (e.g., "Num-NexthopsLegs") and a quantity of bits (e.g., "Flags") associated with providing information about next-hops of a route associated with the label, such as information associated with indicating that the next-hop-legs are used for FRR, information associated with indicating that the next-hop-legs are used for ECMP, or the like.

As further shown in FIG. 5A, and in the fifth row of the BGP label descriptor attribute, information may be provided regarding forwarding semantics of the label. For example, the information may include type-length-value (TLV) information. A type field may be a set of octets of bits associated with identifying a type of label operation, a length field may be a set of octets of bits associated with identifying a length of a value field, and the value field may be a set of sub-TLVs providing information. The one or more "Label-Semantics TLV[s]" are shown in detail with regard to FIGS. 5B and 5C.

As shown in FIG. 5B, a Label-Semantics TLV, of the BGP label descriptor attribute shown in FIG. 5A, may be utilized to provide forwarding semantic information for a first next-hop-leg. As shown in the first row of the "Label-Semantics TLV," a particular set of bits may provide information about a forwarding action. As shown by reference number 505, network device 210 may include information associated with mapping the "LabelSemantic" value to a particular forwarding semantic. For example, a particular "LabelSemantic" value may correspond to a Pop-and-forward action, a swap action, a push action, a Pop-and-IP-lookup action, or the like. In each case, primary network device 210 may, when receiving the label, map the bits in the "LabelSemantic" value to the information indicating a semantic identified by the bits. As further shown in the first row of the "Label-Semantics TLV," the particular sub-TLV may provide a length field (e.g., "Len") indicating a length for information describing routing after secondary network device 210 (e.g., "Nexthop-Descriptor TLV"). As shown in the second row of the "Label-Semantics TLV," the particular sub-TLV may include another set of sub-TLV information to provide information (e.g., forwarding semantic information) regarding the routing after secondary network device 210 (e.g., "Nexthop-Descriptor TLV"). The "Nexthop-Descriptor TLV" is described in detail with regard to FIG. 5C.

As shown in FIG. 5C, the "Nexthop-Descriptor TLV" may include information regarding routing after secondary network device 210 (e.g., routing by another secondary network device 210). In this way, secondary network device 210 may include forwarding semantic information associated with another secondary network device 210 when receiving a label from the other secondary network device 210 and providing the label to primary network device 210. As shown in a first row of the "Nexthop-Descriptor TLV," a first field (e.g., "NhopDescType") may provide information regarding the routing after secondary network device 210 (e.g., "NhopDescType"). As shown by reference number 510, network device 210 (e.g., primary network device 210) may include information associated with mapping the "NhopDescType" field to a set of attributes regarding routing after secondary network device 210 (e.g., routing by the other secondary network device 210). Other sets of bits (e.g., "Flags") may also be included to provide additional contextual information (e.g., attributes of other secondary network device 210, attributes of a network connection connecting secondary network device 210 and the other secondary network device 210, or the like). Additionally, or alternatively, as shown in the third row and the fourth row of the "Nexthop-Descriptor TLV," one or more fields (e.g., "nhop TLV attributes") may include information describing an attribute associated with routing after secondary network device 210.

In this way, a label may be generated that includes sets of bits utilized for describing forwarding semantics.

As indicated above, FIGS. 5A-5C are provided merely as an example. Other examples are possible and may differ from what was described with regard to FIGS. 5A-5C.

FIGS. 6A-6E are diagrams of an example implementation 600 relating to example process 400 shown in FIG. 4. FIGS. 6A-6E show an example of utilizing forwarding information associated with a border gateway protocol (BGP) label to intelligently route network traffic.

Figure 6A:
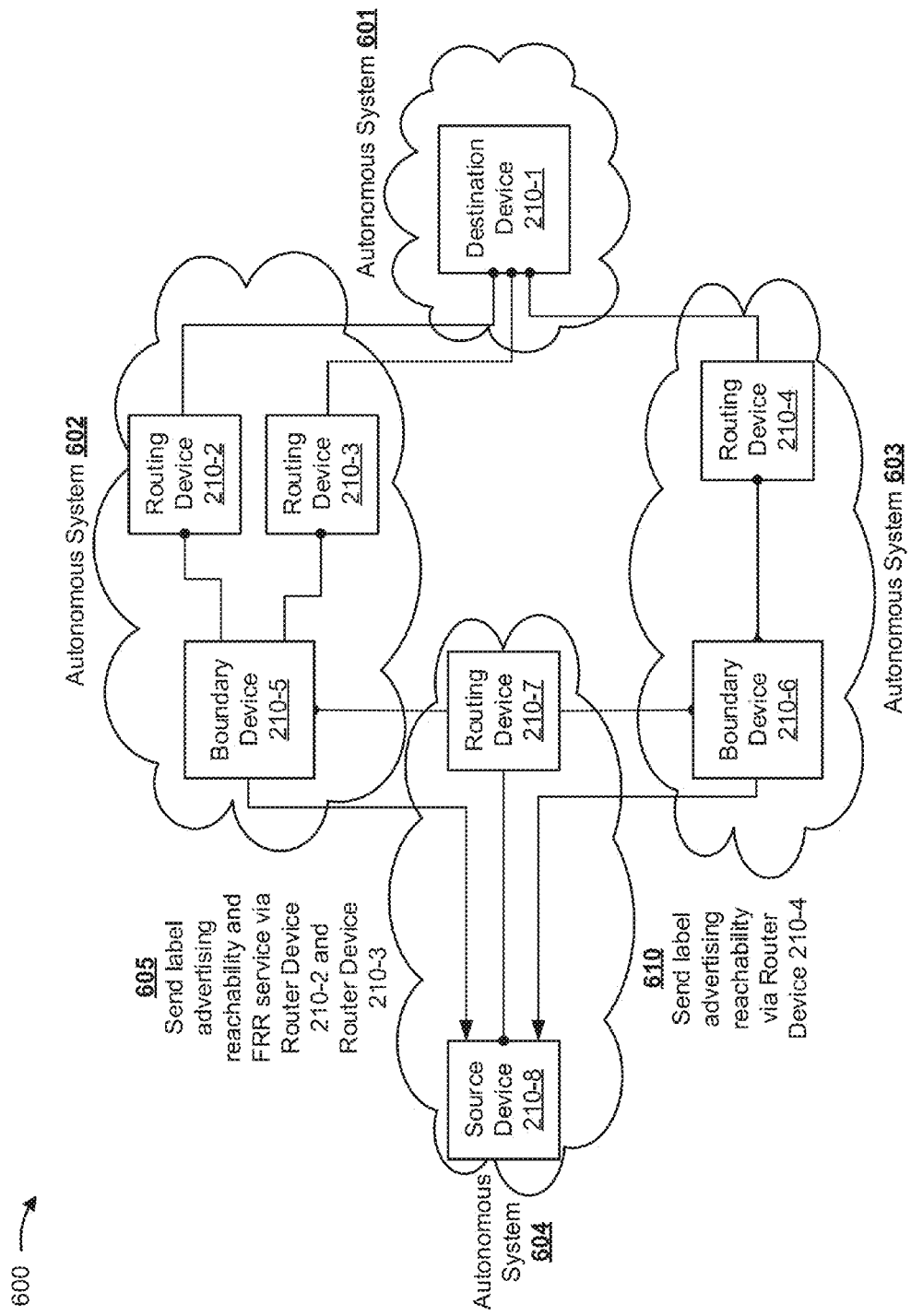

As shown in FIG. 6A, one or more networks include a set of network devices 210, such as destination device 210-1 (e.g., a destination of network traffic), routing device 210-2, routing device 210-3, routing device 210-4, boundary device 210-5 (e.g., an autonomous system boundary router (ASBR)), boundary device 210-6 (e.g., another ASBR), routing device 210-7, and source device 210-8 (e.g., an ingress provider edge router). Destination device 210-1 are associated with autonomous system 601, boundary device 210-5 and routing devices 210-2 and 210-3 are associated with autonomous system 602, boundary device 210-6 and routing device 210-4 are associated with autonomous system 603, and source device 210-8 and routing device 210-7 are associated with autonomous system 604. As shown by reference number 605, boundary device 210-5 transmits a first label, to source device 210-8 via routing device 210-7, advertising reachability of destination device 210-1 (e.g., via autonomous system 602 and via routing device 210-2 and/or routing device 210-3). A label descriptor attribute associated with the first label is described in detail with regard to FIGS. 6B-6D. As shown by reference number 610, boundary device 210-6 transmits, to source device 210-8 via routing device 210-7, a second label advertising reachability of destination device 210-1 (e.g., via autonomous system 603 and via routing device 210-4).

As shown in FIG. 6B, the first label is associated with a BGP Label descriptor attribute that includes multiple sets of bits (e.g., multiple octets) providing information regarding routing of network traffic via boundary device 210-5. For example, as shown in the second row of the BGP Label descriptor attribute, the BGP Label descriptor attribute includes label information encoded in RFC 3107 format (e.g., a BGP label specifying routing information). As shown in the third row of the BGP Label descriptor attribute, a PNH length of 4 is specified and a PNH address is specified as a loopback interface address (e.g., a virtual interface of boundary device 210-5). As shown in the fourth row of the BGP Label descriptor attribute, two next-hops are specified in routing network traffic to destination device 210-1 and utilization of FRR by boundary device 210-5 is indicated. Assume that utilization of the forwarding semantic FRR is preferred to a label that does not include FRR (e.g., assume that the second label is such a label). As shown in the fifth row of the BGP Label descriptor attribute, two label semantic TLVs are included with the label. The two label semantic TLVs are described in detail with regard to FIGS. 6C and 6D, respectively.

As shown in FIG. 6C, a first label semantic TLV of the BGP Label descriptor attribute includes multiple sets of bits (e.g., multiple octets). The first row of the first label semantic TLV includes information identifying a forwarding action (e.g., Pop-and-forward) and information associated with interpreting the first label semantic TLV (e.g., a length of the first label semantic TLV, "Len" and a quantity of next-hops described in the first label semantic TLV, "One Nexthop"). As shown in the remaining rows of the first label semantic TLV, the first label semantic TLV provides information regarding the next-hop, such as information describing a type of routing (e.g., IPv4), a set of flags indicating that the next-hop is a directly connected next-hop that is capable of forwarding IPv4 payload information (e.g., "C=1, 4=1"), information associated with describing an FRR index of the next-hop (e.g., "1"), and a set of octets associated with providing attributes of the next-hop (e.g., another TLV, "NhopAddrTLV . . . "), such as a network address of routing device 210-2 (the next-hop described by the first label semantic TLV) (e.g., "10.1.0.1").

As shown in FIG. 6D, similar information to the first label semantic TLV is provided in the second label semantic TLV. In this case, the network address of routing device 210-3 (the next-hop described by the second label semantic TLV) is provided (e.g., "10.2.0.2").

Figure 6E:
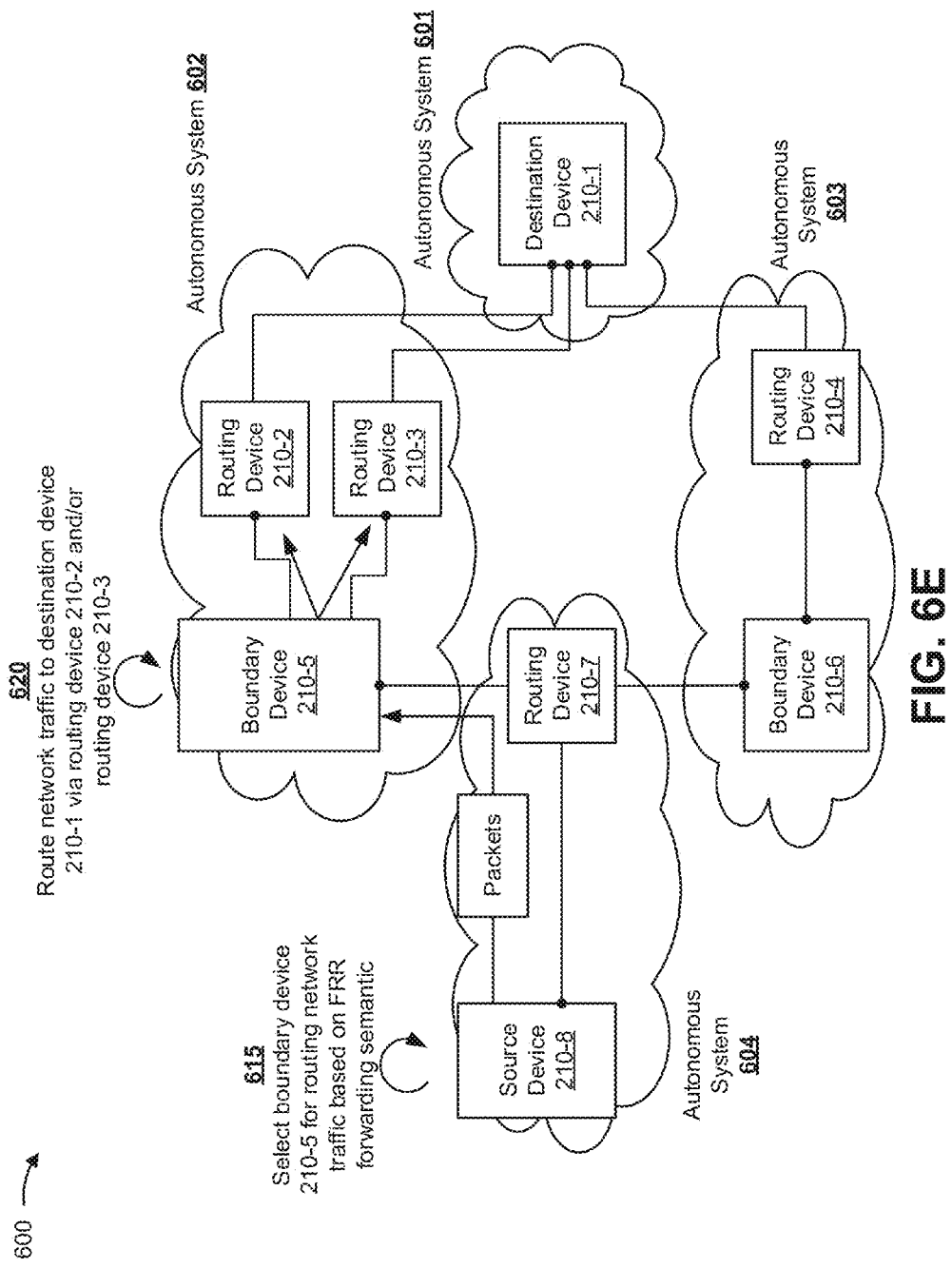

As shown in FIG. 6E, and by reference number 615, source device 210-8 selects boundary device 210-5 based on the BGP Label descriptor attribute indicating that boundary device 210-5 provides FRR as a forwarding semantic (and the second label indicating that boundary device 210-6 does not provide FRR). As shown by reference number 620, when boundary device 210-5 receives traffic from source device 210-8 that is tagged with the BGP Label descriptor attribute, boundary device 210-5 routes the network traffic to destination device 210-1 via routing device 210-2 and/or routing device 210-3 using FRR.

As indicated above, FIGS. 6A-6E are provided merely as an example. Other examples are possible and may differ from what was described with regard to FIGS. 6A-6E.

In this way, secondary network device 210 may encode information in a border gateway protocol label providing information regarding a forwarding semantic of the border gateway protocol label that may be interpreted by primary network device 210 to facilitate selection of the border gateway protocol label based on the forwarding semantic.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a memory; and
one or more processors to:
receive a set of border gateway protocol labels via a set of corresponding border gateway protocol messages,
a first border gateway protocol label, of the set of border gateway protocol labels, being associated with a label descriptor attribute,
the label descriptor attribute being associated with providing information regarding a forwarding semantic associated with the first border gateway protocol label;
determine that routing traffic in accordance with the first border gateway protocol label is associated with at least one of:
causing the traffic to be routed faster than with a second border gateway protocol label, or
causing the traffic to be routed with less packet loss than with the second border gateway protocol label;

select the first border gateway protocol label for routing network traffic toward a network device associated with the first border gateway protocol label based on the label descriptor attribute and based on determining that routing the traffic in accordance with the first border gateway protocol label is associated with at least one of:
  causing the traffic to be routed faster than with the second border gateway protocol label, or
  causing the traffic to be routed with less packet loss than with the second border gateway protocol label; and
route the network traffic toward the network device based on the first border gateway protocol label and after selecting the first border gateway protocol label.

2. The device of claim 1, where the label descriptor attribute includes information identifying at least one of:
  a forwarding action associated with the network device,
  a network device attribute associated with the network device, or
  a network connection attribute associated with a network connection associated with the network device.

3. The device of claim 1, where the one or more processors are further to:
  tag the network traffic with the first border gateway protocol label based on selecting the first border gateway protocol label; and
  where the one or more processors, when routing the network traffic, are further to:
    route the network traffic based on tagging the network traffic with the first border gateway protocol label.

4. The device of claim 1, where the one or more processors are further to:
  receive a border gateway protocol route update;
  identify the label descriptor attribute based on receiving the border gateway protocol route update; and
  determine the forwarding semantic associated with the first border gateway protocol label based on identifying the label descriptor attribute.

5. The device of claim 1, where the one or more processors are further to:
  obtain information associated with mapping information associated with the label descriptor attribute to the forwarding semantic;
  map information associated with the label descriptor attribute to the forwarding semantic using the obtained information; and
  select the first border gateway protocol label based on mapping the information associated with the label descriptor attribute to the forwarding semantic.

6. The device of claim 1, where the one or more processors are further to:
  identify another forwarding semantic associated with another label descriptor attribute of another border gateway protocol label of the set of border gateway protocol labels; and
  where the one or more processors, when selecting the first border gateway protocol label, are further to:
    select the first border gateway protocol label based on the other forwarding semantic and the forwarding semantic.

7. The device of claim 6, where the one or more processors are further to:
  determine a first score for the forwarding semantic and a second score for the other forwarding semantic; and
  where the one or more processors, when selecting the first border gateway protocol label, are further to:
    select the first border gateway protocol label based on the first score and the second score.

8. The device of claim 1, where the one or more processors, when selecting the first border gateway protocol label, are further to:
  select the first border gateway protocol label for routing a first portion of the network traffic,
    the first portion of the network traffic being associated with receiving preferential treatment compared with a second portion of the network traffic,
    the forwarding semantic associated with the first border gateway protocol label being associated with providing preferential treatment compared with another forwarding semantic associated with another border gateway protocol label of the set of border gateway protocol labels; and
  select the other border gateway protocol label for routing the second portion of the network traffic.

9. A method, comprising:
  receiving, by a device, a plurality of border gateway protocol labels from one or more other devices,
    a first border gateway protocol label, of the plurality of border gateway protocol labels, being generated by a particular device of the one or more other devices,
      the first border gateway protocol label being associated with a particular forwarding semantic identified by a particular label descriptor attribute,
      the particular forwarding semantic being stored in a forwarding table of the particular device;
  determining, by the device, the particular forwarding semantic based on the particular label descriptor attribute;
  determining, by the device, that routing traffic in accordance with the first border gateway protocol label is associated with at least one of:
    causing the traffic to be routed faster than with a second border gateway protocol label, or
    causing the traffic to be routed with less packet loss than with the second border gateway protocol label;
  selecting, by the device, the first border gateway protocol label for routing network traffic toward a network device associated with the first border gateway protocol label based on the particular forwarding semantic and based on determining that routing the traffic in accordance with the first border gateway protocol label is associated with at least one of:
    causing the traffic to be routed faster than with the second border gateway protocol label, or
    causing the traffic to be routed with less packet loss than with the second border gateway protocol label; and
  causing, by the device, the network traffic to be routed toward the network device based on the first border gateway protocol label and after selecting the first border gateway protocol label.

10. The method of claim 9, further comprising:
  identifying a prioritization of forwarding semantics; and
  where selecting the first border gateway protocol label further comprises:
    selecting the first border gateway protocol label based on the prioritization of forwarding semantics and the particular forwarding semantic.

11. The method of claim 9, where determining the particular forwarding semantic further comprises:

determining next-hop information associated with the first border gateway protocol label; and where selecting the first border gateway protocol label further comprises:

selecting the first border gateway protocol label based on the next-hop information.

12. The method of claim 9, further comprising:

causing the particular device to perform a forwarding action associated with the particular forwarding semantic based on causing the network traffic to be routed toward the network device.

13. The method of claim 12, where causing the particular device to perform the forwarding action further comprises:

tagging the network traffic with the first border gateway protocol label.

14. A non-transitory computer-readable medium storing instructions, the instructions comprising:

one or more instructions that, when executed by one or more processors of a device, cause the one or more processors to:

receive a set of border gateway protocol labels via a set of corresponding border gateway protocol messages, a first border gateway protocol label, of the set of border gateway protocol labels, being associated with a label descriptor attribute, the label descriptor attribute being associated with providing information regarding a forwarding semantic associated with the first border gateway protocol label;

determine that routing traffic in accordance with the first border gateway protocol label is associated with at least one of:

causing the traffic to be routed faster than with a second border gateway protocol label, or causing the traffic to be routed with less packet loss than with the second border gateway protocol label;

select the first border gateway protocol label for routing network traffic toward a network device associated with the first border gateway protocol label based on the label descriptor attribute and based on determining that routing the traffic in accordance with the first border gateway protocol label is associated with at least one of:

causing the traffic to be routed faster than with the second border gateway protocol label, or causing the traffic to be routed with less packet loss than with the second border gateway protocol label; and route the network traffic toward the network device based on the first border gateway protocol label and after selecting the first border gateway protocol label.

15. The non-transitory computer-readable medium of claim 14, where the label descriptor attribute includes information identifying at least one of:

a forwarding action associated with the network device, a network device attribute associated with the network device, or a network connection attribute associated with a network connection associated with the network device.

16. The non-transitory computer-readable medium of claim 14, where the one or more instructions, when executed by the one or more processors, further cause the one or more processors to:

tag the network traffic with the first border gateway protocol label based on selecting the first border gateway protocol label; and where the one or more instructions, that cause the one or more processors to route the network traffic, further cause the one or more processors to:

route the network traffic based on tagging the network traffic with the first border gateway protocol label.

17. The non-transitory computer-readable medium of claim 14, where the one or more instructions, when executed by the one or more processors, further cause the one or more processors to:

identify the label descriptor attribute based on receiving a set of border gateway protocol route update messages; and determine the forwarding semantic associated with the first border gateway protocol label based on identifying the label descriptor attribute.

18. The non-transitory computer-readable medium of claim 14, where the one or more instructions, when executed by the one or more processors, further cause the one or more processors to:

obtain information associated with mapping information associated with the label descriptor attribute to the forwarding semantic;

map information associated with the label descriptor attribute to the forwarding semantic using the obtained information; and select the first border gateway protocol label based on mapping the information associated with the label descriptor attribute to the forwarding semantic.

19. The non-transitory computer-readable medium of claim 14, where the one or more instructions, when executed by the one or more processors, further cause the one or more processors to:

identify another forwarding semantic associated with another label descriptor attribute of another border gateway protocol label of the set of border gateway protocol labels; and where the one or more instructions, that cause the one or more processors to select the first border gateway protocol label, further cause the one or more processors to:

select the first border gateway protocol label based on the other forwarding semantic and the forwarding semantic.

20. The non-transitory computer-readable medium of claim 19, where the one or more instructions, when executed by the one or more processors, further cause the one or more processors to:

determine a first score for the forwarding semantic and a second score for the other forwarding semantic; and where the one or more instructions, that cause the one or more processors to select the first border gateway protocol label, further cause the one or more processors to:

select the first border gateway protocol label based on the first score and the second score.

* * * * *